Patented Sept. 9, 1947

2,427,303

UNITED STATES PATENT OFFICE 2,427,303

ALKALI METALS IN LOW TEMPERATURE, FRIEDEL-CRAFTS CATALYZED ISOOLEFIN POLYMERIZATION PROCESS

James A. Reid, Bartlesville, Okla., assignor to Phillips Petroleum Company, a corporation of Delaware No Drawing. Application December 14, 1943, Serial No. 514,281

18 Claims. (Cl. 260—93)

1

This invention relates to the catalytic conversion of olefins to hydrocarbons of higher molecular weight. In a particular embodiment it relates to the polymerization of tertiary-base olefins to form resinous and rubber-like materials. In a specific embodiment it relates to the preparation of solid elastic copolymers produced by the copolymerization of a low-boiling tertiary-base olefin and of a low-boiling conjugated diolefin. This application is a continuation-in-part of my copending application Serial No. 402,415, filed on July 14, 1941, now Patent 2,355,925, issued August 15, 1944.

The catalytic polymerization of unsaturated aliphatic hydrocarbons to form compounds of higher molecular weight is well known. By using selected catalysts and conditions for the polymerization it is possible, from many individual unsaturated aliphatic hydrocarbons, to obtain products varying in characteristics from gasoline through the more viscous oils to resinous and rubber-like materials. In order to convert such unsaturated hydrocarbons to polymers having molecular weights in the range of lubricating oils, resins, and rubber-like materials, active metal halides such as aluminum chloride, aluminum bromide, ferric chloride or bromide, zinc chloride, boron fluoride, zirconium bromide or chloride, titanium tetrachloride or tetrabromide, uranium chloride, and the like, which are often called Friedel-Crafts type catalysts, are preferred. Various iodides may also be used. The Friedel-Crafts type catalysts may be employed either alone or in conjunction with various organic or inorganic modifiers, promoters, solvents and the like. In the production of polymers in the lubricant range, which may have molecular weights of about 250 to 1000, reaction temperatures in the range of about 0 to about 200° F. are normally employed, the viscosity and the molecular weight of the product being usually lower with higher reaction temperatures. In the production of polymers which are resins or rubber-like materials at ordinary temperatures lower reaction temperatures are necessary, preferably temperatures below about −75° F. and generally not lower than about −200° F. are normally employed. Materials which find use as synthetic rubbers are produced by polymerizing tertiary-base olefins such as isobutylene, isoamylenes, and the like, within this latter temperature range, either alone or admixed with various diolefins such as butadiene, isoprene, cyclopentadiene and the like. The preparation of such materials has been extensively discussed in Australian Patent 112,875.

2

In the commercial production of such polymers as have been hereinbefore discussed, i. e., those in and above the lubricating oil range, I have found that the presence of even very minute amounts of a hydrogen halide has a variable and adverse effect upon the character of the resulting polymers. As is well known, hydrogen halides readily react with tertiary-base olefins, such as the charge stock or polymers thereof, to produce tertiary alkyl halides; although I do not know whether such adverse effects as are discussed herein result from the presence of a hydrogen halide or of the presence, or the accumulation, of such alkyl halides, the adverse effects are apparently connected somehow with the presence of a hydrogen halide or an organic reaction product thereof. Apparently, however, a primary alkyl halide, such as methyl or ethyl chloride, does not give such an adverse effect if present. The mentioned herein of adverse effects of a hydrogen halide in the reaction mixture is to be read and understood in the light of the preceding discussion. In producing lubricating oils these effects are evidenced by variations in the viscosity index of the resulting polymer product. In the production of products of higher molecular weight, such as those commercially considered to be in the range of synthetic rubber, these adverse effects are evidenced by variations in tackiness, elasticity, and other physical characteristics of the product. In the production of both types of polymers by batch processes one of the outstanding evidences of these adverse effects is the unpredictable and uncontrollable variations between the products of one batch and the products of another batch so that it becomes impossible to produce a series of batch products all of which will meet rigid specifications and/or each of which will be similar in characteristics to the other; these adverse effects result even though considerable care has been given to the purification of the charge stocks and to the establishment of uniform and satisfactory polymerization.

An object of this invention is to polymerize tertiary-base olefins to products of desirable quality and uniformity using a metal halide catalyst.

A further object of this invention is to provide a superior catalytic system for the polymerization of polymerizable unsaturated hydrocarbons.

Still another object of this invention is to polymerize tertiary-base olefins to products of desirable quality and uniformity using a metal halide catalyst in a system substantially free from hydrogen halide.

A further object of this invention is to produce polymeric hydrocarbons in the molecular weight range of rubber.

A still further object of this invention is to produce a solid elastic copolymer from a low-boiling tertiary-base olefin and a low-boiling conjugated diolefin.

Further objects and advantages of this invention will become apparent, to one skilled in the art, from the accompanying disclosure and discussion.

My invention comprises, in a specific embodiment, the use of an alkali metal in conjunction with, or associated with, an active metal halide of the Friedel-Crafts type, which does not react with the alkali metal under the conditions of use, for the reaction of low-boiling tertiary-base olefins, alone or in admixture with low-boiling conjugated diolefins, to form polymeric hydrocarbons in the molecular weight range of rubber. An alkali metal does not catalyze the polymerization of an olefin, or of a diolefin or of a mixture of the two, under the conditions of reaction herein disclosed, nor does it effect the activity of the active metal halide catalyst to any appreciable extent. It is believed that the primary function of the alkali metal which is associated with the active metal halide, or of other material which may be associated with the active metal halide in accordance with this disclosure, is to react with and remove from the polymerization zone hydrogen halide which may be present or formed. Whether or not this is the only function, or even the true function is not conclusively known at this time, although it is believed to be one of the more important factors. The alkali metal, or other material, may have a promoting effect on the active metal halide, or inhibit its catalytic action in one direction while permitting it to be exerted, or promoting its action, in another direction. In connection with my invention it is convenient to speak of reacting unsaturated hydrocarbons, such as olefins, in the presence of a catalyst comprising an active metal halide, or a metal halide catalyst of the Friedel-Crafts type, associated with an alkali metal, or, more broadly, associated with a material which inhibits the formation or continued existence of a hydrogen halide, and such use of the term catalyst in this specification and in the accompanying claims is made with this in mind.

An alkali metal, especially sodium or potassium, when added to a hydrocarbon mixture containing hydrogen halide, removes such hydrogen halide very rapidly and completely or, as the case may be, takes it up as rapidly as it may be formed. Through adequate contact between alkali metal and a hydrocarbon phase the concentration of hydrogen halide in the reaction mixture may thus be maintained extremely low, not only lower than heretofore capable of realization, but also at uniform low concentration which may be duplicated from one time to another by specifying, and obtaining, standard conditions for the various materials employed, i. e., reactants, catalysts, alkali metal, diluents, etc, and for the reaction conditions, i. e., temperature, reactor size, degree of mixing, particle size and amount for the alkali metal, etc. To obtain intimate contact between alkali metal and the other components of the reaction mixture it is preferred that the alkali metal be either very finely divided or in the liquid state. Although the use of finely divided liquid alkali metal is preferred, it is not possible to obtain this condition at the extremely low temperatures necessary for the production of a synthetic rubber. It is possible to obtain this material in a finely divided, efficient form by effecting an intimate mixture between the alkali metal, and an inert liquid at a temperature at which the alkali metal is a liquid and cooling this mixture so that the alkali metal solidifies while still in a pure and finely divided form. When following this procedure it is, of course, necessary to ensure that all of the materials used are quite pure and are not in contact, and do not come into contact, with reactive materials such as oxygen, sulfur compounds, water or other reactive oxygen-containing compounds, hydrogen halides, or the like. It is also advantageous to use as the inert liquid the material which will subsequently be used as an inert diluent in the polymerization step. Thus, I may prepare finely divided sodium by effecting a vigorous mechanical mixing of sodium and liquid butane at a temperature of about 210° F., or somewhat higher, until the sodium is present as minute liquid particles, and cooling this mixture to a temperature at which all of the sodium is solidified. Potassium may likewise be produced in a like form at a somewhat lower temperature, such as about 150° F., and liquid propane or liquid butane may be used as the liquid both for producing the finely divided metal and for the subsequent polymerization. A mixture of sodium and potassium is liquid at still lower temperatures and may be used with such a low-boiling liquid as liquid ethane to produce the necessary finely divided particles. In some instances it may be possible to coat a finely divided solid such as activated charcoal with the pure molten metal. However, since this latter material will be difficult to remove from the resulting polymer this modification should not be used unless the presence of such solid material in the polymer product is not deleterious.

The proportion of alkali metal used will be somewhat dependent upon the rate of evolution of hydrogen halide in the reaction mixture and by the effectiveness of the contact between the alkali metal and the conversion system. In most batch polymerizations it has been found desirable to use from about 25 to about 100 per cent by weight as much alkali metal as active metal halide catalyst. When a great proportion of the alkali metal can be recovered unchanged from the polymerization products, however, a relatively small proportion of alkali metal will be consumed. A large excess of sodium or other alkali metal is desirable to facilitate removal of hydrogen halide from the reaction mixture.

By tertiary-base olefins I intend to include, in general, such olefins which correspond to the formula $R_2C=CR'_2$ where each R is any alkyl group and each R' is hydrogen or any alkyl group. Such olefins, upon hydrolysis in an acidic medium, will generally yield a tertiary alcohol. Typical low-boiling tertiary-base olefins are 2-methyl-propene, 2-methyl-1-butene, 2-methyl-2-butene, 2-methyl-1-pentene, 2-methyl-2-pentene, 3-methyl-2-pentene, and the like. In the practice of my invention I prefer to use such olefins that contain not more than 7 carbon atoms per molecule.

By low-boiling conjugated olefins I intend to include, in general, such diolefins as 1, 3-butadiene, 2-methyl-1-butadiene or isoprene, any one of the 1,3-pentadienes or mixtures thereof, 2,3-dimethyl-1,3-butadiene, cyclopentadiene, methyl cyclopentadiene, and the like having not more than 7 carbon atoms per molecule.

As is known to the art the characteristics of the product will depend somewhat upon the ratio of olefin to diolefin in the reaction mixture, which will generally be between about 4:1 and 100:1, upon the extent of reaction, upon the ratio of these two reactants which have entered into the reaction, and upon the reaction conditions, including especially temperature, catalyst used, and the amount of catalyst used. In the practice of my invention it is not necessary to deviate particularly from the reaction conditions heretofore used, the advantages of the invention being derived not so much from a change in the reaction conditions such as those just enumerated, but from conducting the reaction under more reproducible conditions and with greater predictability and uniformity of results than heretofore possible.

*Example I*

As an example of the practice of my invention, approximately 200 parts of n-butane was introduced into a reactor held at −94° F. Seven parts of anhydrous aluminum chloride and one part of finely divided metallic sodium were added to the reactor. A mixture consisting of 20 parts isobutylene and one part butadiene was passed into the reactor at such a rate that 100 parts were added during a period of four hours. Stirring of the reaction mixture was vigorously carried out during this time and was continued for several more hours. After deactivating the catalyst by introducing anhydrous ammonia gas, the mixture was filtered, and the diluent removed from the filtrate by evaporation. The residue was an elastic mass having an iodine number of 6.0 which could be compounded, milled, and cured similarly to natural rubber.

Upon repetition of this procedure, products having closely similar properties were obtained, whereas upon conducting a series of runs using identical conditions, but without the metallic sodium present, the properties of the product varied over a wide range.

*Example II*

Sodium-potassium alloy was prepared by heating one part sodium and two parts potassium under an inert hydrocarbon to a temperature of about 210° F. Two parts of this alloy was placed in a glass reaction flask equipped with a motor-driven stirrer and containing about 100 parts of liquid paraffin hydrocarbon. This sodium-potassium alloy was liquid at room temperature. One part aluminum chloride was added to the reaction flask. While stirring continuously, the temperature of the flask was increased to 220° F. The flask was held at this temperature and four additional parts of aluminum chloride was added. There was no evidence of reaction between the sodium-potassium alloy and the aluminum chloride. The flask and its contents were allowed to cool to room temperature. The system was found to be highly active for the polymerization of various iso-olefin mixtures. This run showed that aluminum chloride catalyst is not deactivated by sodium or potassium metal in this temperature range.

It will be appreciated that various embodiments of my invention, and various modifications of each embodiment, may be practiced, by one skilled in the art, in the light of the present disclosure and discussion without departing from the spirit or scope thereof or from the scope of the claims.

I claim:

1. A process of preparing a solid elastic copolymer, which comprises reacting together at a reaction temperature between about −75 and about −200° F. isobutylene and butadiene in the presence of a metal halide catalyst of the Friedel-Crafts type associated with an alkali metal, said alkali metal being present in an amount from about 25 to about 100 per cent by weight of said metal halide catalyst and being essentially unreactive as an olefin polymerizing catalyst under the reaction conditions.

2. A process of preparing a solid elastic copolymer, which comprises reacting together at a reaction temperature between about −75 and about −200° F. isobutylene and butadiene in the presence of aluminum chloride associated with an alkali metal, said alkali metal being present in an amount from about 25 to about 100 per cent by weight of said aluminum chloride and being essentially unreactive as an olefin polymerizing catalyst under the reaction conditions.

3. The process of claim 2 in which said alkali metal is sodium.

4. The process of claim 2 in which said alkali metal is potassium.

5. A process of preparing a solid elastic copolymer, which comprises reacting together at a reaction temperature between about −75 and about −200° F. isobutylene and butadiene in the presence of a metal halide catalyst of the Friedel-Crafts type associated with an alkali metal, said alkali metal being present in an amount from about 25 to about 100 per cent by weight of said metal halide catalyst, the mol ratio of said olefin and of said diolefin in the reaction mixture being between about 4:1 and about 100:1.

6. A process of preparing a solid, elastic hydrocarbon material, which comprises reacting together at a reaction temperature of about −90 to about −100° F. isobutylene and butadiene, the mol ratio of isobutylene and butadiene in the reaction mixture being about 20:1, in the presence of anhydrous aluminum chloride associated with finely divided metallic sodium, said sodium being present in an amount from about 25 to about 100 per cent by weight of said aluminum chloride.

7. The process of claim 6 in which said reaction is conducted in the presence of liquid butane as an inert diluent and reaction medium.

8. A process of preparing a solid elastic hydrocarbon material, which comprises subjecting to polymerization a hydrocarbon material comprising isobutylene at a reaction temperature between about −75 and −200° F. in the presence of anhydrous aluminum chloride associated with finely divided metallic sodium, said sodium being present in an amount from about 25 to about 100 per cent by weight of said aluminum chloride.

9. A process for preparing a solid, elastic copolymer, which comprises reacting together at a reaction temperature between about −75 and about −200° F. a tertiary-base olefin having not more than 7 carbon atoms per molecule and a conjugated diolefin having not more than 7 carbon atoms per molecule in the presence of a metal halide catalyst of the Friedel-Crafts type associated with an alkali metal, said alkali metal being present in an amount from about 25 to about 100 per cent by weight of said metal halide catalyst and being essentially unreactive as an olefin polymerizing catalyst under the reaction conditions.

10. The process for preparing a solid, elastic copolymer, which comprises reacting together at a reaction temperature between about −75 and about −200° F. a tertiary-base olefin having not more than 7 carbon atoms per molecule and a conjugated diolefin having not more than 7 carbon atoms per molecule in the presence of aluminum chloride associated with an alkali metal, said alkali metal being present in an amount from about 25 to about 100 per cent by weight of said aluminum chloride and being essentially unreactive as an olefin polymerizing catalyst under the reaction conditions.

11. The process of claim 2 in which said alkali metal is an alloy of sodium and potassium.

12. The process for preparing a solid, aliphatic hydrocarbon material, which comprises polymerizing a tertiary-base olefin having not more than 7 carbon atoms per molecule at a polymerization temperature below −75° F. in the presence of a metal halide catalyst of the Friedel-Crafts type associated with an alkali metal, said alkali metal being present in an amount from about 25 to about 100 per cent by weight of said metal halide catalyst and being essentially unreactive as an olefin polymerizing catalyst under the reaction conditions.

13. In a process of preparing a solid, elastic copolymer, which comprises reacting together at a temperature between −75 and −200° F. a tertiary-base olefin having not more than 7 carbon atoms per molecule and a conjugated diolefin having not more than 7 carbon atoms per molecule in the presence of a metal halide catalyst of the Friedel-Crafts type, the mol ratio of said olefin and of said diolefin in the reaction mixture being between 4:1 and 100:1, small quantities of hydrogen halide being present or formed, the improvement which comprises maintaining in admixture with said reacting materials an alkali metal in an amount which is at least sufficient to react with all hydrogen halide present and is not greater than 100 per cent by weight of said metal halide catalyst.

14. In a process of preparing a solid, elastic hydrocarbon material, which comprises polymerizing a tertiary-base olefin having not more than 7 carbon atoms per molecule at a polymerization temperature below −75° F. in the presence of a metal halide catalyst of the Friedel-Crafts type, small quantities of hydrogen halide being present or formed, the improvement which comprises maintaining in admixture with said reacting materials an alkali metal in an amount which is at least sufficient to react with all hydrogen halide present and is not greater than 100 per cent by weight of said metal halide catalyst.

15. In a process of preparing a solid, elastic copolymer, which comprises reacting together at a temperature between −75 and −200° F. a tertiary-base olefin having not more than 7 carbon atoms per molecule and a conjugated diolefin having not more than 7 carbon atoms per molecule in the presence of a metal halide catalyst of the Friedel-Crafts type, small quantities of hydrogen halide being present or formed, the improvement which comprises maintaining in admixture with said reacting materials an alkali metal in an amount which is at least sufficient to react with all hydrogen halide present and is not greater than 100 per cent by weight of said metal halide catalyst.

16. In a process of preparing a solid, elastic copolymer, which comprises reacting together at a temperature between −75 and −200° F. a tertiary-base olefin having not more than 7 carbon atoms per molecule and a conjugated diolefin having not more than 7 carbon atoms per molecule in the presence of aluminum chloride, small quantities of hydrogen chloride being present or formed, the improvement which comprises maintaining in admixture with said reacting materials an alkali metal in an amount which is at least sufficient to react with all hydrogen chloride present and is not greater than 100 per cent by weight of said aluminum chloride.

17. The process of claim 14 in which said alkali metal is an alloy of sodium and potassium.

18. The process of claim 15 in which said alkali metal is an alloy of sodium and potassium.

JAMES A. REID.

REFERENCES CITED

The following references are of record in the file of this patent:

UNITED STATES PATENTS

| Number | Name | Date |
|---|---|---|
| 2,291,510 | Thomas | July 28, 1942 |